(12) United States Patent
Kulkarni et al.

(10) Patent No.: US 11,153,761 B2
(45) Date of Patent: Oct. 19, 2021

(54) SPECTRUM MANAGEMENT FOR COEXISTENCE OF HETEROGENEOUS WIRELESS TECHNOLOGIES

(71) Applicant: Cisco Technology, Inc., San Jose, CA (US)

(72) Inventors: Santosh Babaji Kulkarni, San Jose, CA (US); Vishal Satyendra Desai, San Jose, CA (US); Pooya Monajemi, Irvine, CA (US); Young Il Choi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 108 days.

(21) Appl. No.: 16/736,620

(22) Filed: Jan. 7, 2020

(65) Prior Publication Data

US 2021/0211885 A1 Jul. 8, 2021

(51) Int. Cl.
*H04W 16/14* (2009.01)
*H04W 72/04* (2009.01)
(Continued)

(52) U.S. Cl.
CPC .......... *H04W 16/14* (2013.01); *H04B 17/318* (2015.01); *H04W 48/10* (2013.01);
(Continued)

(58) Field of Classification Search
CPC . H04W 16/14; H04W 48/10; H04W 72/0453; H04W 72/082; H04W 72/085;
(Continued)

(56) References Cited

U.S. PATENT DOCUMENTS 9,253,778 B2 2/2016 Ye et al.
9,706,545 B2 7/2017 Touag et al.
(Continued)

FOREIGN PATENT DOCUMENTS

WO 2017134490 A1 8/2017

OTHER PUBLICATIONS

Notification of Transmittal of the International Search Report and the Written Opinion of the International Searching Authority issued in International Patent Application PCT/US2020/067663, dated Apr. 28, 2021 (17 pages).

*Primary Examiner* — Mewale A Ambaye
(74) *Attorney, Agent, or Firm* — Merchant & Gould P.C.

(57) ABSTRACT

Spectrum management may be provided. A first Radio Frequency (RF) event metric may be received from a first service end point. The first RF event metric may comprise a time a first event occurred. A second RF event metric may be received from a second service end point. The second RF event metric may comprise a time a second event occurred. Then it may be determined that the time the first event occurred and the time the second event occurred are substantially congruent. Next, in response to determining that the time the first event occurred and the time the second event occurred are substantially congruent, the first service end point and the second service end point may be grouped in a first RF group thereby allowing frequency re-use across similar RF groups. Then different channels may be assigned to the first service end point and the second service end point.

20 Claims, 4 Drawing Sheets

(51) Int. Cl.
  *H04B 17/318*  (2015.01)
  *H04W 48/10*  (2009.01)
  *H04W 72/08*  (2009.01)

(52) U.S. Cl.
  CPC ..... *H04W 72/0453* (2013.01); *H04W 72/082* (2013.01); *H04W 72/085* (2013.01)

(58) Field of Classification Search
  CPC ..... H04W 72/04; H04W 72/12; H04W 40/16; H04W 52/24; H04B 17/318; H04B 17/327; H04B 17/336
  See application file for complete search history.

(56) References Cited

U.S. PATENT DOCUMENTS

| | | | |
|---|---|---|---|
| 9,872,233 B2 | | 1/2018 | Jeon et al. |
| 10,624,126 B2* | | 4/2020 | Novlan ............. H04W 72/0413 |
| 2015/0351115 A1* | | 12/2015 | Jeon ..................... H04W 16/14 |
| | | | 455/450 |
| 2015/0373554 A1 | | 12/2015 | Freda et al. |
| 2016/0174217 A1* | | 6/2016 | Salem .................. H04W 72/04 |
| | | | 455/454 |
| 2019/0364565 A1* | | 11/2019 | Hmimy ............. H04W 72/0453 |
| 2019/0380064 A1* | | 12/2019 | Salem .................. H04W 16/14 |
| 2020/0137584 A1* | | 4/2020 | Xue ..................... H04W 28/26 |

* cited by examiner

SPECTRUM MANAGEMENT FOR COEXISTENCE OF HETEROGENEOUS WIRELESS TECHNOLOGIES

TECHNICAL FIELD

The present disclosure relates generally to the coexistence of heterogeneous wireless technologies.

BACKGROUND

Long-Term Evolution-Unlicensed (LTE-U) is an adaptation of the LTE standard that operates in unlicensed frequency bands. As currently defined by the 3rdGeneration Partnership Project (3GPP), LTE-U targets 5 GHz and other unlicensed frequency bands. In addition, other unlicensed wireless wide area networks, including Licensed Assisted Access (LAA) and MulteFire, also use frequency bands in the 5 GHz range. As a consequence, LTE-U, LAA, Multe-Fire, and other unlicensed wireless wide area network technologies, operate in some of the same frequency bands defined for the Institute of Electrical and Electronic Engineers (IEEE) 802.11 standard (e.g., the 5 GHz frequency bands). The spectrum overlap between unlicensed and Wi-Fi can present spectrum access and interference problems for wireless access points and eNodeBs/eNodeGs that are concurrently operating within transmission range of each other in a given geographical region.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
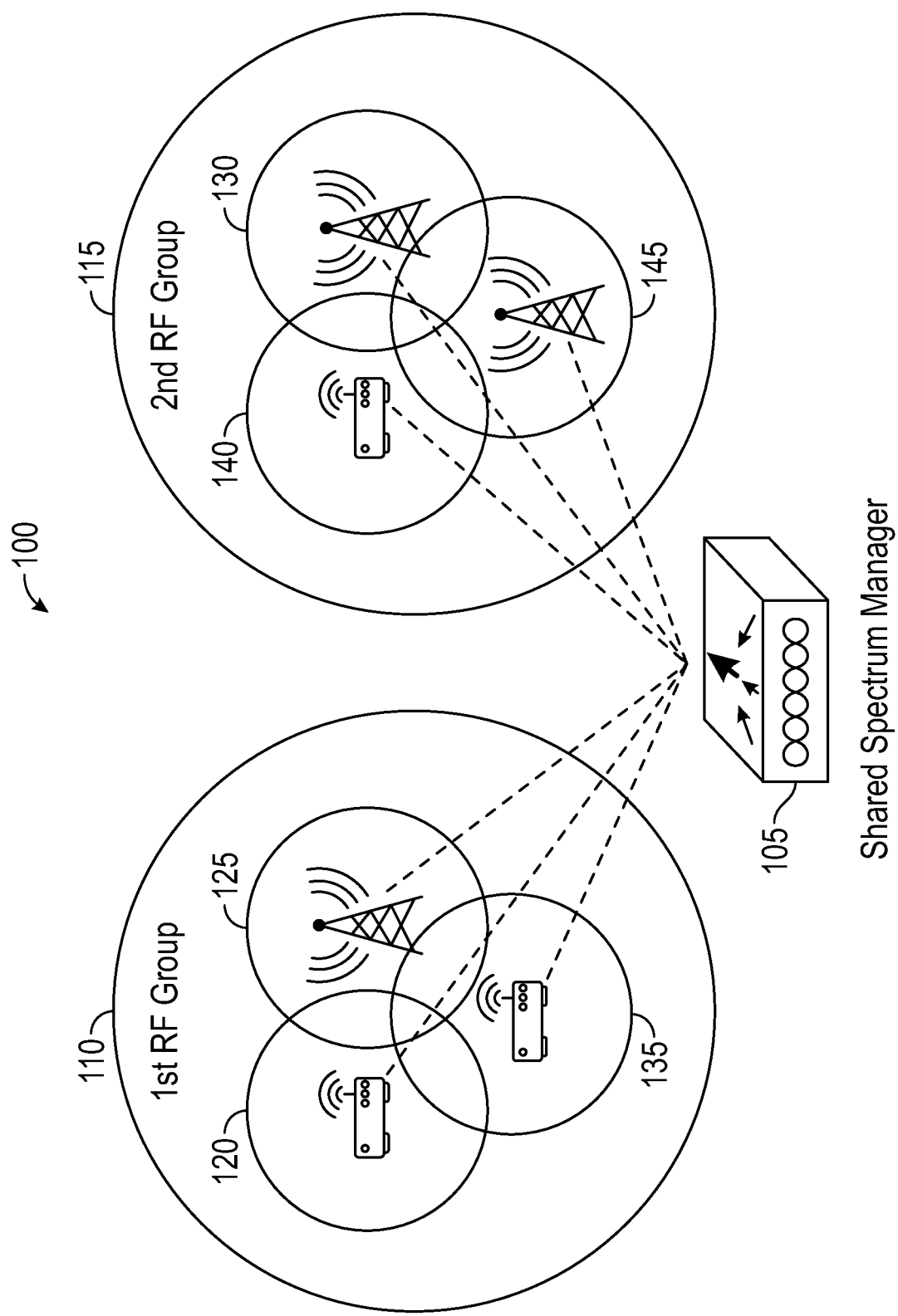
FIG. 1 is a block diagram of an operating environment.

Spectrum management for coexistence of heterogeneous wireless technologies may be provided. A first Radio Frequency (RF) event metric may be received from a first service end point. The first RF event metric may comprise a time a first event occurred. A second RF event metric may be received from a second service end point. The second RF event metric may comprise a time a second event occurred. Then it may be determined that the time the first event occurred and the time the second event occurred are substantially congruent. Next, in response to determining that the time the first event occurred and the time the second event occurred are substantially congruent, the first service end point and the second service end point may be grouped in a first RF group thereby allowing frequency re-use across similar RF groups. Then different channels may be assigned to the first service end point and the second service end point.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Unlicensed frequency bands (such as 2.4 GHz Industrial, Scientific, and Medical (ISM) and 5 GHz U-NII (Unlicensed National Information Infrastructure bands)) have played a role in magnifying the scope and penetration of wireless technologies. Institute of Electrical and Electronic Engineers' (IEEE's) wireless local area networking standards (i.e., 802.11a/b/g/n/ac/ax) are examples of proliferating unlicensed band technologies for mobile applications. With up to 500 MHz of unlicensed spectrum available in the 5 GHz band on a global basis, even operators of licensed spectrum may deploy solutions that may tap into in this free spectrum. For example, to overcome spectrum shortages and to boost cellular network capacity, cellular service providers may deploy unlicensed Long Term Evolution (LTE) in the 5 GHz band. As a result, the unlicensed 5 GHz band has emerged as a spectrum for launching new wireless applications and services. This has given rise to deployment scenarios where heterogeneous networks may compete for their share of the unlicensed spectrum at any given location. This situation may be rendered more complex because competing technologies often do not understand each other (e.g., MulteFire vs. 802.11 Wi-Fi standards) or when they do, they may tend to use the same spectrum differently (802.11a vs 802.11ax). An unplanned and unmanaged deployment may impact user experience. Thus, embodiments of the disclosure may provide a coexistence process that may allow heterogeneous technologies to work together in order to optimize spectrum use.

FIG. 1 shows an operating environment 100. As shown in FIG. 1, operating environment 100 may comprise a Shared Spectrum Manager (SSM) 105, a first Radio Frequency (RF) group 110, a second RF group 115, and a plurality of service end points. The plurality of service end points may comprise a first service end point 120, a second service end point 125, a third service end point 130, a fourth service end point 135, a fifth service end point 140, and a sixth service end point 145. First RF group 110 may include first service end point 120, second service end point 125, and fourth service end point 135. Second RF group 115 may include third service end point 130, fifth service end point 140, and sixth service end point 145.

A plurality of client devices may be associated with the plurality of service end points. Individual ones of the plurality of client devices may comprise, but not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

First service end point 120, fourth service end point 135, and fifth service end point 140 may comprise wireless Access Points (APs) that may provide network access using Wi-Fi technology, via a Wireless Local Area Network (WLAN) using a router connected to a service provider. Second service end point 125, third service end point 130, and sixth service end point 145 may comprise devices that may be connected to a cellular network and that may communicate directly and wirelessly with client devices. The cellular network may comprise, but is not limited to, a Long-Term Evolution (LTE) broadband cellular network, a Fourth Generation (4G) broadband cellular network, or a Fifth Generation (5G) broadband cellular network, operated by a service provider. For example, second service end point 125, third service end point 130, and sixth service end point 145 may comprise eNodeBs (eNBs) or gNodeBs (gNBs).

First service end point 120, fourth service end point 135, and fifth service end point 140 may operate using a different wireless standard than second service end point 125, third service end point 130, and sixth service end point 145. For example, first service end point 120, fourth service end point 135, and fifth service end point 140 may operate using the Institute of Electrical and Electronic Engineers (IEEE) 802.11 standard. In contrast, second service end point 125, third service end point 130, and sixth service end point 145 may operate using the Long Term Evolution in Unlicensed spectrum (LTE-U) standard, the License Assisted Access (LAA) standard, or the MulteFire standard for example.

Embodiments of the disclosure may provide a process that dynamically assigns frequency ranges in an unlicensed spectrum to competing wireless technologies. SSM 105 may optimize the usage of a shared unlicensed spectrum and may also allow heterogeneous wireless technologies to coexist. While SSM 105 may be shown in FIG. 1 as a standalone system, embodiments of the disclosure may also comprise SSM 105 as a software module within a Radio Resource Management (RRM) system or within Wireless LAN Controllers.

The elements described above of operating environment 100 (e.g., SSM 105, first service end point 120, second service end point 125, third service end point 130, fourth service end point 135, fifth service end point 140, and sixth service end point 145) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
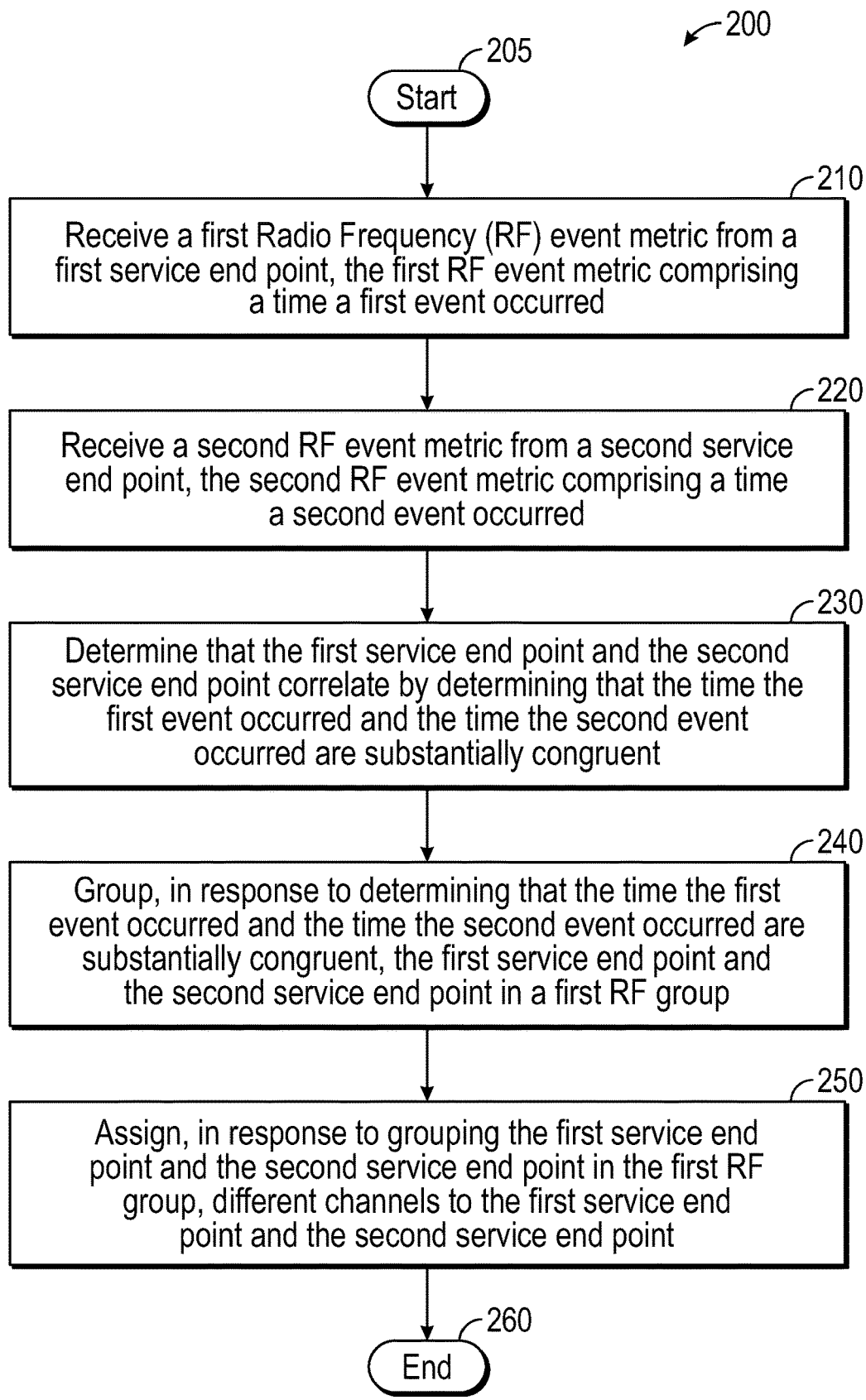
FIG. 2 is a flow chart of a method for providing spectrum management for coexistence of heterogeneous wireless technologies.

FIG. 2 is a flow chart setting forth the general stages involved in a method 200 consistent with embodiments of the disclosure for providing spectrum management for coexistence of heterogeneous wireless technologies. Method 200 may be implemented using SSM 105 as described in more detail above with respect to FIG. 1. Ways to implement the stages of method 200 will be described in greater detail below.

Method 200 may begin at starting block 205 and proceed to stage 210 where SSM 105 may receive a first RF event metric from first service end point 120. For example, first service end point 120 attempting to utilize an unlicensed spectrum, may periodically report key RF metrics to SSM 105. End point 120 may compile these RF metrics by either using a dedicated monitor radio or through periodic off-channel measurements from its serving radio. The first RF event metric may comprise a time a first event occurred. The first event may comprise, for example, first service end point 120 making a transmission or first service end point 120 detecting an interference.

In some embodiments of the disclosure, first service end point 120 may use a user configurable control channel to assist in neighbor discovery. First service end point 120 may use this user configurable control channel to transmit neighbor discovery frames and to also measure interference from other transmitting neighbors. For example, first service end point 120 may make the aforementioned transmission over the user configurable control channel or first service end point 120 may detect an interference in the user configurable control channel. The times these events (e.g., transmission and interference detection) occurred on the user configurable control channel may be reported in the first RF event metric.

From stage 210, where SSM 105 receives the first RF event metric from first service end point 120, method 200 may advance to stage 220 where SSM 105 may receive a second RF event metric from second service end point 125. For example, second service end point 125 attempting to utilize an unlicensed spectrum, may periodically report key RF metrics to SSM 105. End point 125 may compile these RF metrics by either using a dedicated monitor radio or through periodic off-channel measurements from its serving radio. The second RF event metric may comprise a time a second event occurred. The second event may comprise, for example, second service end point 125 making a transmission or second service end point 125 detecting an interference.

In some embodiments of the disclosure, second service end point 125 may use a user configurable control channel to assist in neighbor discovery. Second service end point 125 may use this user configurable control channel to transmit neighbor discovery frames and to also measure interference from other transmitting neighbors. For example, second service end point 125 may make the aforementioned transmission over the user configurable control channel or second service end point 125 may detect an interference in the user configurable control channel. The times these events (e.g., transmission and interference detection) occurred on the user configurable control channel may be reported in the second RF event metric.

Once SSM 105 receives the second RF event metric from second service end point 125, method 200 may continue to stage 230 where SSM 105 may determine that first service end point 120 and second service end point 125 correlate by determining that the time the first event occurred and the time the second event occurred are substantially congruent. Substantially congruent may comprise the time of the first event and the time of the second event being within a range of 0 ms to 5 ms of each other. For example, service end points (e.g., first service end point 120 and second service end point 125) attempting to utilize unlicensed spectrum, periodically report their key RF metrics to SSM 105. While these service end points may not have the ability to discover neighboring service end points that use different technologies, SSM 105 may correlate various RF events captured in the service end point RF metrics. For example, when an eNB (e.g., second service end point 125) reports a transmission event in its RF metrics sent to SSM 105, a neighboring AP (e.g., first service end point 120) may report interference for the same time window in its RF metrics. Similarly, when an AP e.g., (first service end point 120) reports a transmission event in its RF metrics sent to SSM 105, a neighboring eNB (e.g., second service end point 125) may report interference for the same time window in its RF metrics.

Figure 3:
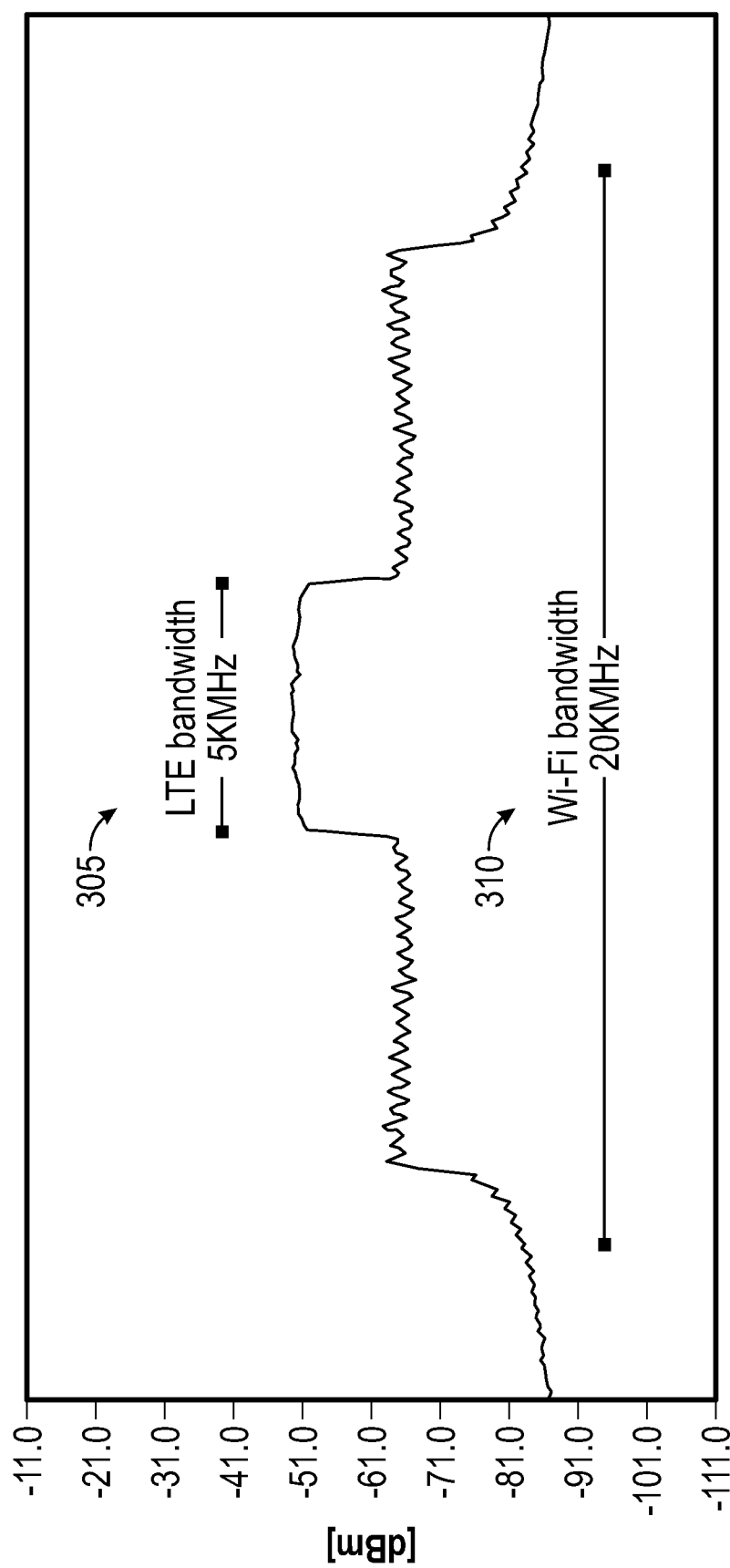
FIG. 3 is a block diagram of a Long Term Evolution (LTE) and a Wi-Fi signal in frequency versus power analysis.

This relationship between eNB (e.g., second service end point 125) and AP (e.g., first service end point 120) may be illustrated by FIG. 3. When they are congruent (i.e., occurring substantially at the same time) eNB (e.g., second service end point 125) transmission 305 may comprise interference for AP (e.g., first service end point 120) transmission 310 and AP (e.g., first service end point 120) transmission 310 may comprise interference for eNB (e.g., second service end point 125) transmission 305. SSM 105 may correlate reports of transmission with reports of interference using any correlation process to identify neighboring service end points.

After SSM 105 determines that first service end point 120 and second service end point 125 correlate by determining that the time the first event occurred and the time the second event occurred are substantially congruent in stage 230, method 200 may proceed to stage 240 where SSM 105 may group, in response to determining that the time the first event occurred and the time the second event occurred are substantially congruent, first service end point 120 and second service end point 125 in first RF group 110. For example, SSM 105 may correlate reports of transmission with reports of interference as described above to identify neighboring service end points and then may group neighboring service end points into RF groups. Because first service end point 120 and second service end point 125 correlate, they may be grouped into first RF group 110. Because third service end point 130 may not correlate with first service end point 120 and second service end point 125, it may not be grouped with first service end point 120 and second service end point 125. Rather third service end point 130 may correlate with fifth service end point 140 and sixth service end point 145 and therefore be grouped by SSM 105 into second RF group 115.

In some embodiments, SSM 105 may rely on RF metrics reported by dedicated multi-technology monitor radios to identify and group neighboring service end points into RF groups. Such monitoring radios may be co-located with APs and eNBs. In some embodiments, multi-technology wireless client devices like mobile phones and laptops may be queried by service end points for air scan reports that are then forwarded to SSM 105. SSM 105 may then correlate client device's air scan report with the client device's location to group neighboring service end points into RF groups. Client devices may tag their air scan reports with location via GPS, for example, whenever possible or their location may be deduced using third party services.

In some embodiments, multi-technology sensors like Active Sensors may periodically forward air scan reports to SSM 105. SSM 105 may then correlate the sensor reports with their location to group neighboring service end points into RF groups. As with wireless client devices, Active Sensors may tag their air scan reports with location via GPS, for example, when possible or their location may be deduced using third party services.

From stage 240, where SSM 105 groups, in response to determining that the time the first event occurred and the time the second event occurred are substantially congruent, first service end point 120 and second service end point 125 in first RF group 110, method 200 may advance to stage 250 where SSM 105 may assign, in response to grouping first service end point 120 and second service end point 125 in first RF group 110, different channels to first service end point 120 and second service end point 125. For example, arranging neighboring endpoints into RF groups (i.e., first RF group 110 and second RF group 115) allows SSM 105 to re-use frequency bands across RF groups. This is because transmissions from service end points belonging to one RF group cause no noticeable interference on service end points belonging to a different RF group. Once RF groups are arranged, SSM 105 may determine a resource requirement score for each service end point within an RF group based, for example, on characteristics such as its radio capability, client device capability, traffic, and quality of service.

With respect to radio capability, SSM 105 may take into account the capabilities of the radio of each service end point in the RF group. For example, radios that support Orthogonal Frequency-Division Multiple Access (OFDMA) may cope better with Dynamic Frequency Selection (DFS) channels than non-OFDMA radios because OFDMA supporting radios may "puncture" their transmissions in the event of a radar hit whereas non-OFDMA radios may have to vacate the whole channel.

With respect to client device capability, SSM 105 may take into account the capabilities of the client devices associated to each service end point in the RF group. For example, radios serving many high efficiency client devices (e.g., laptops or mobile phones) may need to be assigned a greater share of bandwidth or a cleaner channel as opposed to radios serving IoT client devices.

With respect to traffic, SSM 105 may take into account service end points that actually serve uplink/downlink traffic. For example, radios serving uplink/downlink traffic may be assigned greater bandwidth or a cleaner channel as opposed to idle radios.

With respect to quality of service, SSM 105 may take into account the type of traffic on the radio. For example, a radio serving voice or video traffic may be assigned greater bandwidth or a cleaner channel as opposed to radios serving best effort traffic for example.

The resource requirement score may be determined by assigning weights to each of the aforementioned example characteristics. SSM 105 may then rank each service end point in an RF group (e.g., first RF group 110 and second RF group 115) by their resource requirement score. A service end point with the highest score may be assigned the best possible channel whereas the one with the lowest score may be assigned a lesser quality channel.

To evaluate the quality of each channel for an RF group, SSM 105 may consider the RF metrics reported by the RF group's service end points and combine their noise, interference, and load metrics into a single Received Signal Strength Indicator (RSSI) based metric known as a cost metric. This cost metric may represent a Signal to Interference Plus Noise Ratio (SINR) of a specific channel and may be used to evaluate the throughput potential of one channel over another. Following this, SSM 105 may match a best channel or channels with service end points that may have the highest resource requirement score such that the expected co-channel interference may be minimized across the RF group. This may be accomplished using optimization processes such as linear programming or game theory for example. In some embodiments, SSM 105 may request RRM to determine a channel plan for all service end points in an RF group given their resource requirement scores and bandwidth constraints.

By minimizing co-channel interference, SSM 105 may ensure that heterogeneous service end points may coexist and may also ensure that each competing technology (e.g., LTE vs. Wi-Fi) may receive a fair share of the unlicensed spectrum that matches their requirements. Once SSM 105 assigns, in response to grouping first service end point 120 and second service end point 125 in first RF group 110, different channels to first service end point 120 and second service end point 125 in stage 250, method 200 may then end at stage 260.

Figure 4:
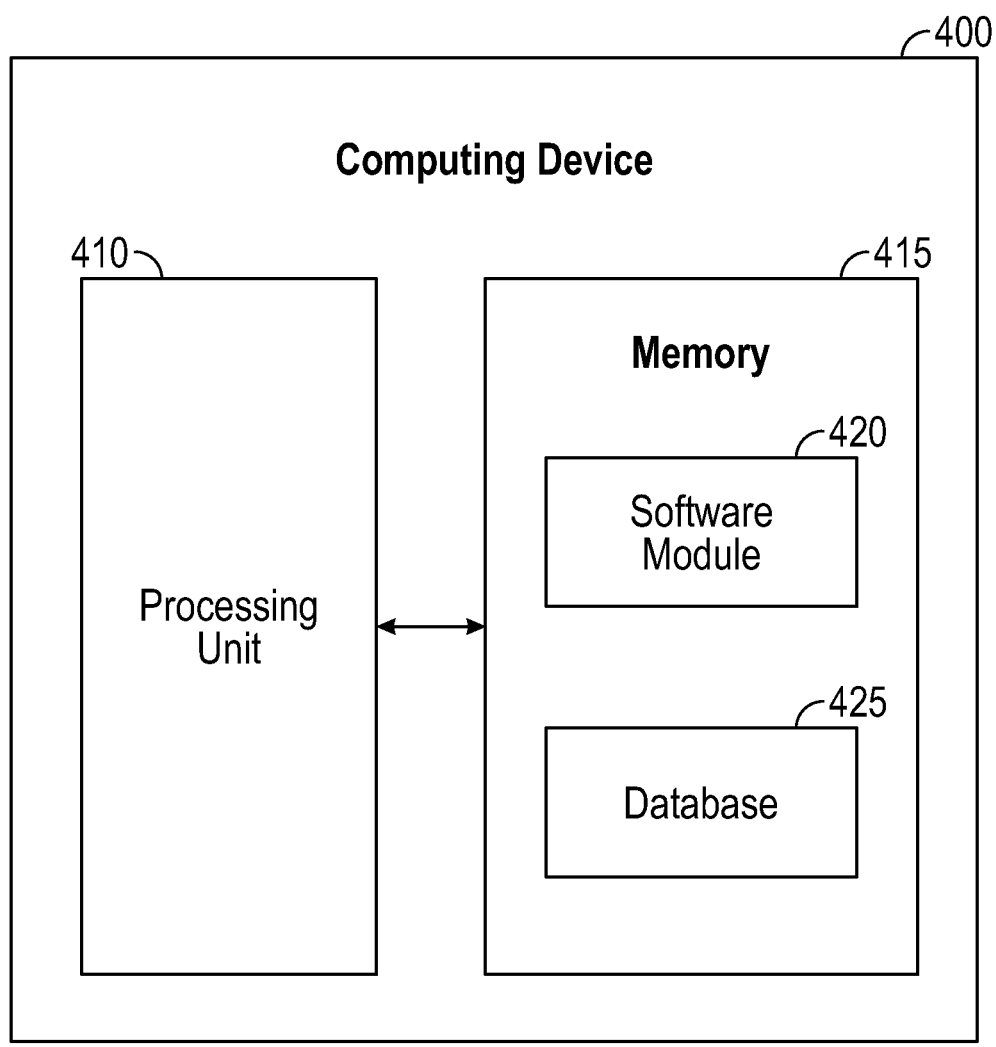
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing spectrum management for coexistence of heterogeneous wireless technologies as described above with respect to FIG. 2. Computing device 400, for example, may provide an operating environment for SSM 105, first service end point 120, second service end point 125, third service end point 130, fourth service end point 135, fifth service end point 140, or sixth service end point 145. SSM 105, first service end point 120, second service end point 125, third service end point 130, fourth service end point 135, fifth service end point 140, and sixth service end point 145 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method executed by a computing device, the method comprising:
   receiving a first Radio Frequency (RF) event metric from a first service end point, the first RF event metric comprising a time a first event occurred;
   receiving a second RF event metric from a second service end point, the second RF event metric comprising a time a second event occurred;
   determining that the first service end point and the second service end point correlate by determining that the time the first event occurred and the time the second event occurred are substantially congruent, wherein substantially congruent comprises the time the first event occurred and the time the second event occurred being within a range of 0 ms to 5 ms of each other;
   grouping, in response to determining that the time the first event occurred and the time the second event occurred are substantially congruent, the first service end point and the second service end point in a first RF group thereby allowing frequency re-use across similar RF groups; and
   assigning, in response to grouping the first service end point and the second service end point in the first RF group, different channels to the first service end point and the second service end point.

2. The method of claim 1, wherein the first service end point operates using a first standard and the second service end point operates using a second standard.

3. The method of claim 2, wherein the first standard comprises Institute of Electrical and Electronic Engineers (IEEE) 802.11 standard.

4. The method of claim 2, wherein the second standard comprises one of: Long Term Evolution in Unlicensed spectrum (LTE-U) standard; License Assisted Access (LAA) standard; and MulteFire standard.

5. The method of claim 1, wherein the first service end point comprises a wireless Access Point (AP).

6. The method of claim 1, wherein the second service end point comprises one of: an eNodeB (eNB) and an gNodeB (gNB).

7. The method of claim 1, wherein the first event comprises making a transmission by the first service end point.

8. The method of claim 1, wherein the second event comprises detecting, by the second service end point, an interference.

9. The method of claim 1, wherein assigning the different channels to the first service end point and the second service end point comprises:
   determining respective resource requirement scores for the first service end point and for the second service end point;
   providing respective ranks to the first service end point and to the second service end point based on their respective determined resource requirement scores; and
   assigning the different channels to the first service end point and the second service end point based on respective quality levels of the different channels and the respective provided ranks of the first service end point and the second service end point.

10. The method of claim 9, wherein determining the respective resource requirement scores comprises determining the respective resource requirement scores based on at least one of: radio capabilities of the first service end point and the second service end point; capabilities of client devices associated to the first service end point and client devices associated to the second service end point; traffic volume served by the first service end point and the second service end point; quality of service levels served by the first service end point and the second service end point; and quality potential of all channels in each RF group evaluated by combining noise, interference, and load metric into a single RSSI based cost metric.

11. The method of claim 1, further comprising assigning one of the different channels assigned to one of the first service end point and the second service end point to a third service end point that did not correlate to the first service end point and the second service end point and is grouped in a second RF group.

12. The method of claim 1, further comprising using a configurable control channel by the first service end point and the second service end point to obtain data from which to respectively create the first RF event metric and the second RF event metric.

13. A system comprising:
   a memory storage; and
   a processing unit coupled to the memory storage, wherein the processing unit is operative to:
   receive a first Radio Frequency (RF) event metric from a first service end point, the first RF event metric comprising a time a first event occurred wherein the first event comprises making a transmission by the first service end point wherein the first service end point comprises a wireless Access Point (AP);
   receive a second RF event metric from a second service end point, the second RF event metric comprising a time a second event occurred wherein the second event comprises detecting, by the second service end point, an interference wherein the first service end point operates using a first standard and the second service end point operates using a second standard wherein the second service end point comprises one of: an eNodeB (eNB) and an gNodeB (gNB);
   determine that the first service end point and the second service end point correlate by determining that the time the first event occurred and the time the second event occurred are substantially congruent, wherein substantially congruent comprises the time the first event occurred and the time the second event occurred being within a range of 0 ms to 5 ms of each other;
   group, in response to determining that the time the first event occurred and the time the second event occurred are substantially congruent, the first service end point and the second service end point in a first RF group thereby allowing frequency re-use across similar RF groups; and
   assign, in response to grouping the first service end point and the second service end point in the first RF group, different channels to the first service end point and the second service end point.

14. The system of claim 13, wherein the processing unit being operative to assign the different channels to the first service end point and the second service end point comprises the processing unit being operative to:

determine respective resource requirement scores for the first service end point and for the second service end point;

provide respective ranks to the first service end point and to the second service end point based on their respective determined resource requirement scores; and assign the different channels to the first service end point and the second service end point based on respective quality levels of the different channels and the respective provided ranks of the first service end point and the second service end point.

15. The system of claim 14, wherein the processing unit being operative to determine the respective resource requirement scores comprises the processing unit being operative to determine the respective resource requirement scores based on at least one of: radio capabilities of the first service end point and the second service end point; capabilities of client devices associated to the first service end point and client devices associated to the second service end point; traffic volume served by the first service end point and the second service end point; and quality of service levels served by the first service end point and the second service end point.

16. The system of claim 13, wherein the processing unit is further operative to assign one of the different channels assigned to one of the first service end point and the second service end point to a third service end point that did not correlate to the first service end point and the second service end point and is grouped in a second RF group.

17. A non-transitory computer-readable medium that stores a set of instructions which when executed by a processor of the computer perform stages comprising:

receiving, by a computing device, a first Radio Frequency (RF) event metric from a first service end point, the first RF event metric comprising a time a first event occurred;

receiving a second RF event metric from a second service end point, the second RF event metric comprising a time a second event occurred wherein the first service end point operates using a first standard and the second service end point operates using a second standard;

determining that the first service end point and the second service end point correlate by determining that the time the first event occurred and the time the second event occurred are substantially congruent, wherein substantially congruent comprises the time the first event occurred and the time the second event occurred being within a range of 0 ms to 5 ms of each other;

grouping, in response to determining that the time the first event occurred and the time the second event occurred are substantially congruent, the first service end point and the second service end point in a first RF group;

assigning, in response to grouping the first service end point and the second service end point in the first RF group, different channels to the first service end point and the second service end point; and assigning one of the different channels assigned to one of the first service end point and the second service end point to a third service end point that did not correlate to the first service end point and the second service end point and is grouped in a second RF group.

18. The non-transitory computer-readable medium of claim 17, wherein the first standard comprises Institute of Electrical and Electronic Engineers (IEEE) 802.11 standard and wherein the second standard comprises one of: Long Term Evolution in Unlicensed spectrum (LTE-U) standard; License Assisted Access (LAA) standard; and MulteFire standard.

19. The non-transitory computer-readable medium of claim 17, wherein assigning the different channels to the first service end point and the second service end point comprises:

determining respective resource requirement scores for the first service end point and for the second service end point;

providing respective ranks to the first service end point and to the second service end point based on their respective determined resource requirement scores; and assigning the different channels to the first service end point and the second service end point based on respective quality levels of the different channels and the respective provided ranks of the first service end point and the second service end point.

20. The non-transitory computer-readable medium of claim 19, wherein determining the respective resource requirement scores comprises determining the respective resource requirement scores based on at least one of: radio capabilities of the first service end point and the second service end point; capabilities of client devices associated to the first service end point and client devices associated to the second service end point; traffic volume served by the first service end point and the second service end point; and quality of service levels served by the first service end point and the second service end point.

* * * * *